Figure 1:

No. 852,136. PATENTED APR. 30, 1907.
C. PIETZNER.
PROCESS FOR PRODUCING PICTURE COPIES BY MEANS OF TRANSFER PHOTOGRAPHIC FILMS.
APPLICATION FILED NOV. 12, 1906.

Witnesses
Wm D. Bell
Wm L. Platt

Inventor,
Carl Pietzner,
per Gartner Leward,
attorneys.

UNITED STATES PATENT OFFICE.

CARL PIETZNER, OF VIENNA, AUSTRIA-HUNGARY.

PROCESS FOR PRODUCING PICTURE COPIES BY MEANS OF TRANSFER PHOTOGRAPHIC FILMS.

No. 852,136.     Specification of Letters Patent.     Patented April 30, 1907.

Application filed November 12, 1906. Serial No. 342,966.

*To all whom it may concern:*

Be it known that I, CARL PIETZNER, royal and imperial court photographer, a subject of the Emperor of Austria, and a resident of Vienna, in the Empire of Austria, VI. Mariahilferstrasse 3, have invented an Improved Process for Producing Picture Copies by Means of Transfer Photographic Films; and I do hereby declare the following to be a full, clear, and exact description of the invention, such as will enable others skilled in the art to which it appertains to make and use the same.

It is well known roughly to paint over a photograph and to place a collodion film over the layer of color with which the said photograph is provided. It is also well known to color ordinary or screened photographs on the surface or on the back, and to transfer them to a backing or support. The above processes are not only unreliable, but present unsurmountable difficulties, even for the most experienced photographer.

The process according to this invention has been practically tried and can be easily carried out by any expert or amateur, and by means of the said process even inferior photographs can be rendered very artistic, so that their value will be considerably increased, even apart from coloring.

The process is substantially as follows:

The outlines of a transfer photographic film obtained in the well known manner, or of a picture, are traced and transferred, by tracing, on any desired backing, for instance canvas, wood, paper, ivory, leather or metal. The film picture is transferred to an auxiliary support, for instance paper, celluloid, glass etc. which support must, however, be previously prepared in such manner that the picture (the film) must be able subsequently to come off automatically. To that end, a gelatin coating is preferably used to which have been added tanning substances, for instance formalin, chrome-alum, or the like, in order to prevent the said layer from expanding or becoming dissolved, so that the film does not alter, even in water, and therefore must remain, whatever be the adhesive materials used, exactly in accordance with the traced outline to which the film is to be transferred, which is of great importance for obtaining a successful result.

In order to make the picture come off automatically from the auxiliary support, the gelatin coating is covered again with a shellac coating, the whole is again dried, and then waxed with, say, ether wax. The transferred picture-film remains adhering to the said layer until it is heated to a considerable extent, whereupon the picture becomes automatically detached. The tracing previously obtained, is simply painted with the desired colors, the outlines being strictly adhered to, but care must be taken that the colors are put on very smoothly, which can be easily done by means of a scraper. If the colors are put on too roughly, they would appear on the front side of the picture a little smoother it is true, but still too rough even then. The proper spreading or smoothing on transparent film supports can be done during the painting itself, so that a failure becomes impossible. After the background has been colored in accordance with the tracing, the film is transferred to it and made to adhere by means of some suitable binding substance, for instance, shellac or gelatin solution to which so much acetone, methyl or the like has been added, that the transfer film or picture-layer is softened by the said adhesive substance, but not dissolved, in order (which is a very important point) that the color should be able to penetrate into the softened picture-layer, whereby not only a color effect hitherto unattained, but at the same time a homogeneous connection, is attained.

It is preferable to place the adhesive substance on the background carrying the colors, in order that the action should take place only when the film is sticking fast, in order to prevent the outlines from running. The coincidence of outlines in transparent film supports can be easily obtained, but in non-transparent supports, it would be necessary to make certain marks whereby to accurately adapt the film support to the tracing background. If the work be at all carefully performed, no failure is possible as neither the tracing, the support nor the film can shift, and therefore they must fit together. The photograph remains correct in the smallest details, and the finished pictures have a freshness and natural appearance of the colors like those of a picture by a first-class artist. In this way oil paintings can be imitated on canvas, water colors prepared on paper, silk etc. or even miniatures painted on ivory. In specially fine or small work, the back of the film might also be painted. This is preferably done by coating the film with a thin solution of acetone or the like, and by coloring all the fine details and tones, such as lips, cheeks, eyes, gold and lace etc.; the colors becoming fixed automatically by the acetone solution and forming a fine harmonious whole by subsequent connection with the traced colored support.

Figure 2:
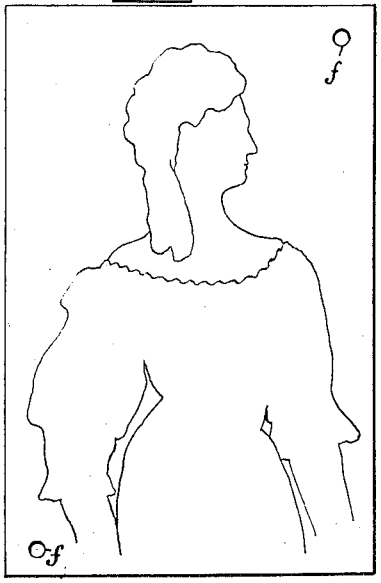
Figure 3:
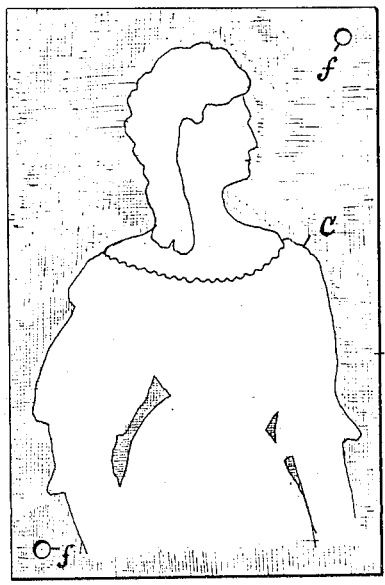
Figure 4:
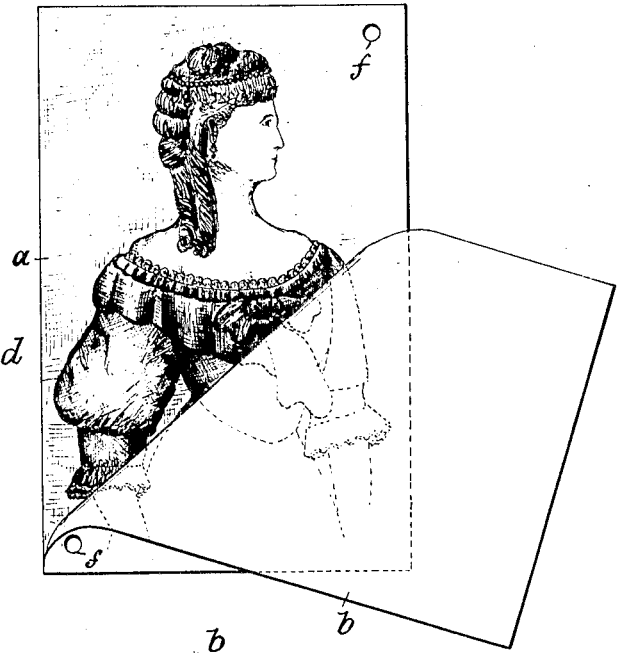

The accompanying drawing illustrates the steps of the process, Figure 1 showing a copy from a negative detachably arranged on a suitable support; Figure 2 a reversed tracing made from said copy; Fig. 3 a reproduction on a suitable background of the tracing of Fig. 2; Fig. 4 the background in Fig. 3 colored or tinted as desired and the original copy covering the same, the support for the copy being partly removed or drawn away; and, Fig. 5 a sectional view of Fig. 4, the support appearing a little raised from the film after the same has been laid on the background.

In said drawing, $a$ is the copy made from a suitable negative; $b$ the support to which said copy (or film) is made to detachably adhere; $c$ is an outline made therefrom by tracing on a background $d$ and which outline is then filled in with colors as in Fig. 4, after which the support carrying the copy is laid on the background and the copy made to adhere thereto, whereupon the support $b$ is drawn away, as in Fig. 4, leaving the film on the background and giving the painting or filled-in outline on the background light, shadows and expression.

$f$ designates holes or other marks whereby the several parts are made to truly register during the process so as to preserve conformity of their corresponding portions throughout.

The tracing is preferably made from the back of support $b$ (which should be for that purpose somewhat transparent) so that when the film or copy finally covers the background its front side will be exposed, although the picture is reversed.

What I claim as my invention and desire to secure by Letters Patent is:

1. The process of preparing picture copies which consists in reproducing the outline of a transfer photographic film onto a suitable background, filling in the outline thus produced in imitation of the original object, detachably applying the film to a suitable support, placing the support, with the film attached, on the back-ground and causing the film to adhere to the back-ground, and then removing the support, substantially as described.

2. The process of preparing picture copies which consists in reproducing the outline of a transfer photographic film onto a suitable background, filling in the outline thus produced in imitation of the original object, detachably applying the film to a suitable support, applying a film-softening adhesive to the background, placing the support, with the film attached, on the background and with the film in contact with the background, and then removing the support, substantially as described.

In testimony whereof I have signed my name to this specification in the presence of two subscribing witnesses.

CARL PIETZNER.

Witnesses:
  WENZEL SINKE,
  ALVESTO S. HOGUE.